(12) United States Patent
Berman

(10) Patent No.: US 12,419,445 B1
(45) Date of Patent: Sep. 23, 2025

(54) MIRROR ASSEMBLY AND METHOD OF USE

(71) Applicant: Daniel Berman, Los Angeles, CA (US)

(72) Inventor: Daniel Berman, Los Angeles, CA (US)

( * ) Notice: Subject to any disclaimer, the term of this patent is extended or adjusted under 35 U.S.C. 154(b) by 0 days.

(21) Appl. No.: 19/083,896

(22) Filed: Mar. 19, 2025

Related U.S. Application Data

(60) Provisional application No. 63/567,310, filed on Mar. 19, 2024.

(51) Int. Cl.
- *A47G 1/04* (2006.01)
- *A63B 21/00* (2006.01)
- *F16M 11/42* (2006.01)

(52) U.S. Cl.
CPC ............ *A47G 1/04* (2013.01); *A63B 21/4029* (2015.10); *F16M 11/42* (2013.01); *A63B 2225/12* (2013.01)

(58) Field of Classification Search
None
See application file for complete search history.

(56) References Cited

U.S. PATENT DOCUMENTS

| | | | | |
|---|---|---|---|---|
| 1,626,474 A * | 4/1927 | Morrison | ............. | A45D 33/008 132/305 |
| 2,597,473 A * | 5/1952 | Green | ............. | A45C 5/005 294/142 |
| 3,009,268 A * | 11/1961 | George, Sr. | ............. | A63D 1/00 434/249 |
| 3,539,247 A * | 11/1970 | Broussard | ............. | A61B 1/253 359/507 |
| 4,388,678 A * | 6/1983 | Turner | ............. | F21S 6/005 362/345 |
| 4,531,813 A * | 7/1985 | Van den Berg | ...... | G02B 7/1824 5/908 |
| 4,679,916 A * | 7/1987 | Roller | ............. | G02C 7/14 359/862 |
| 5,174,576 A * | 12/1992 | Lee | ............. | A63B 24/0003 359/882 |
| 5,270,751 A * | 12/1993 | Christian | ............. | G02B 30/35 348/E13.058 |
| 5,901,702 A * | 5/1999 | Bernard | ............. | B63C 11/205 128/201.27 |
| 5,997,147 A * | 12/1999 | Tatoian | ............. | G02B 7/1824 359/857 |
| 6,059,417 A * | 5/2000 | Tatoian | ............. | F16M 13/02 359/857 |
| 6,104,424 A * | 8/2000 | McNelley | ............. | G02B 30/56 353/74 |
| 7,108,610 B1 * | 9/2006 | Florian | ............. | A63B 24/0003 473/266 |
| 10,500,438 B1 * | 12/2019 | Lemire | ............. | A63B 24/0003 |
| 11,048,026 B2 * | 6/2021 | James | ............. | G02B 7/1824 |
| 11,077,337 B1 * | 8/2021 | Majkrzak | ............. | A63B 23/02 |

(Continued)

*Primary Examiner* — Garrett K Atkinson
(74) *Attorney, Agent, or Firm* — Jeffer Mangels; Butler & Mitchell LLP; Brennan C. Swain, Esq.

(57) ABSTRACT

A mirror assembly that includes a center post, and a mirror arm assembly connected to and movable with respect to the center post. The mirror arm assembly includes a mirror that is movable between a retracted position and a deployed position. The mirror arm assembly is movable between a stowed position and a use position. The mirror assembly can be positioned adjacent to or on an exercise apparatus so that a user can view themselves while exercising.

6 Claims, 6 Drawing Sheets

(56) References Cited

U.S. PATENT DOCUMENTS

| | | | |
|---|---|---|---|
| 2005/0052100 A1* | 3/2005 | Horning | B62B 1/12 |
| | | | 211/14 |
| 2015/0352401 A1* | 12/2015 | Johnson | A63B 22/0235 |
| | | | 482/54 |
| 2017/0351168 A1* | 12/2017 | Zhu | G03B 21/58 |
| 2018/0274777 A1* | 9/2018 | Torrez | G02B 7/182 |
| 2019/0053646 A1* | 2/2019 | Grin | G02B 7/1824 |
| 2020/0081166 A1* | 3/2020 | James | G02B 5/10 |
| 2021/0157844 A1* | 5/2021 | Andon | A63F 13/352 |
| 2022/0079355 A1* | 3/2022 | Boehm | G02B 7/198 |
| 2022/0107493 A1* | 4/2022 | Volpi-Crawford | G02B 25/005 |
| 2022/0288449 A1* | 9/2022 | Roberts | A63B 21/00058 |
| 2023/0026251 A1* | 1/2023 | Tracy | F16M 11/105 |
| 2024/0359048 A1* | 10/2024 | Campanaro | A63B 22/205 |

* cited by examiner

MIRROR ASSEMBLY AND METHOD OF USE

CROSS-REFERENCE TO RELATED APPLICATIONS

This application claims the benefit of U.S. Provisional Application No. 63/567,310, filed on Mar. 19, 2024, the entirety of which is incorporated by reference herein.

FIELD OF THE INVENTION

The present invention relates to a mirror assembly or movable reflective surface that allows users to view themselves from multiple positions, such as during exercise or the like, including without limitation users who practice Pilates.

BACKGROUND OF THE INVENTION

There are many well-known exercise apparatuses including well known Pilates apparatuses and studios. Many such studios include mirror(s) on their walls, but the mirror is fixed to the walls or ceiling (generally flush) and is not readily movable and is not disposed adjacent the user to allow the user to see select body parts. There is a need for an apparatus and studio set up to facilitate instruction for the person having exercise instructions, particularly where it would be helpful for a person in a supine position. Other scenarios, such as in hospitals, in dressing rooms, bathrooms, or the like their may also be a need for multiple mirror or reflective surface devices where a user can see themselves. For example, in most department stores, the dressing rooms only have fixed mirrors on the wall, and many are not floor length, and one cannot see well their backside.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention there is provided a mirror assembly that includes a center post, and a mirror arm assembly connected to and movable with respect to the center post. The mirror arm assembly includes a mirror that is movable between a retracted position and a deployed position. The mirror arm assembly is movable between a stowed position and a use position. The mirror arm assembly may include a container member. In the retracted position, the mirror is positioned in the container member and in the deployed position, at least a portion of the mirror is positioned outside of the container member. It will be appreciated that a small end portion of the mirror may be positioned outside of the container member in the retracted position (as shown in some of the figures). Furthermore, the deployed position can be any position where a significant portion is outside of the container member so that the mirror can be used. The claims are not limited to the entire mirror having to be inside the container member in the retracted position and the entire mirror being outside the container member in the deployed position. A person of ordinary skill in the art would appreciate the meaning of these terms and in the retracted position, the mirror is not usable to see a user's reflection for the purpose and in the deployed position, the mirror is usable to see a user's reflection for the purpose. This does not mean that in the retracted position the mirror has to be rolled up. It may be flat and usable, but not in a position where, for example, a Pilates user can see the mirror, but then they move the mirror so it is usable, which is the deployed position. In the retracted position the mirror may be in a rolled format.

In accordance with another aspect of the present invention there is provided an exercise apparatus that includes a bench with a top surface configured for a user, and a mirror assembly that includes a mirror positioned above the top surface of the bench and facing the user. The mirror is movable with respect to the top surface. Preferably, the mirror assembly includes one or more telescoping legs that are connected to the mirror. The mirror is movable toward and away from the top surface via the one or more telescoping legs. The mirror may be movable between a retracted position and a deployed position. The mirror assembly of the exercise apparatus may include a container member and the mirror is disposed in the container member when the mirror is in the retracted position. The exercise apparatus may include one or more vertically extending bars and the mirror assembly is positioned above the top surface via the one or more vertically extending bars.

In accordance with another aspect of the present invention there is provided a method of using a reflective surface that includes obtaining a mirror assembly that includes at least a first mirror, moving the first mirror from a retracted position to a deployed position, and viewing a reflection in the first mirror. The mirror assembly may include a center post and a first mirror arm assembly connected to the center post, where the first mirror is associated with the first mirror arm assembly. The method may include moving the first mirror arm assembly from a stowed position to a use position prior to step (b). The mirror arm assembly can be oriented in any desired position. The mirror arm assembly (and/or the mirror) can be pivoted, rotated, translated, telescoped, etc. to position as desired. A second mirror arm assembly and mirror may be included and the first mirror may be oriented at a different angle than the second mirror. The first mirror arm assembly may include a first container member, and in the retracted position, the first mirror is positioned in the first container member and in the deployed position, the first mirror is positioned outside of the first container member. In use, the mirror assembly may be positioned adjacent an exercise apparatus.

In one preferred embodiment of the present invention, an exercise apparatus or mirror assembly and studio having a surface upon which a user sits, stands, or lays, and where the exercise requires alignment of the user's body and/or body parts such as arms and legs, and where adjacent to the area of the user's body to be exercised, there is a reflecting surface not including standard studio wall and ceiling mounted mirrors, to aid the person in being properly aligned for the exercise. In another preferred embodiment of the invention a portable multi mirror stand is provided which can be positioned adjacent the body part to be aligned so the exercise users can readily see the body part to be aligned. The portable stand may also include a single movable mirror. In another embodiment of the present invention, the moveable mirror apparatus can be deployed in other environments such, without limitation, as near a hospital bed or in a dressing room or bathroom, or the like.

The exercise apparatus may include a flat table surface for the user to lay upon. The apparatus and assembly may be used or positioned in an exercise studio, where the studio includes tables for persons who are exercising to lay upon.

The surface above the table may include a reflective surface. The table surface having a length and width. The mirror has a length and width which may be about the length and width of the table surface. The studio may be a Pilates studio, and the exercise apparatus may be a Pilates apparatus. A rollable and movable vertically reflecting surface may be used to face the part of the user's body to be aligned. The present invention may include a method of exercising which exercise requires proper alignment of a body portion to be exercised and may also include providing a surface upon which the person exercising lays; and providing a reflective surface adjacent the portion of the user's body requiring proper alignment for exercising, where the reflective surface or mirror is movable. The surface may be the upper surface of a table or bench, the portion of the user's body that requires proper alignment may be the user's legs, and the user lays in a supine position, whereby the legs can be seen by the user through the mirror. The studio may include multiple mirror assemblies or mirrors associated with or positioned adjacent multiple exercise apparatuses or stations, etc., each with a movable or repositionable mirror.

DETAILED DESCRIPTION OF THE PREFERRED EMBODIMENTS

Figure 1:
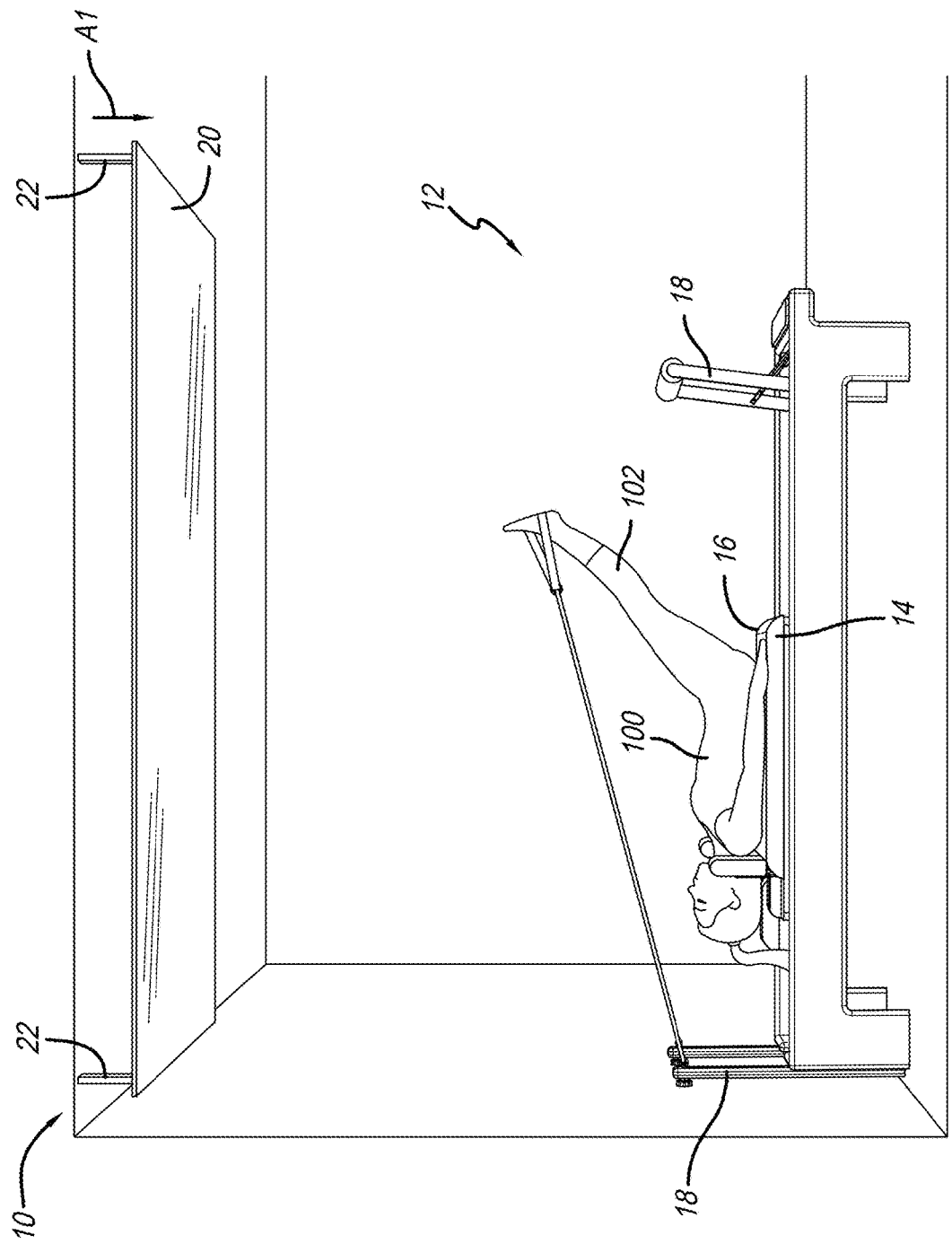
FIG. 1 shows one embodiment of an exercise apparatus of the present invention with a movable mirror assembly.

The following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be, but not necessarily are references to the same embodiment; and such references mean at least one of the embodiments. If a component is not shown in a drawing, then this provides support for a negative limitation in the claims stating that that component is "not" present. However, the above statement is not limiting, and, in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

With reference to FIG. 1, a preferred embodiment of the mirror assembly 10 as part of an exercise apparatus 12 of the present invention, which may be a Pilates reformer. The Pilates reformer exercise apparatus 10 includes a moveable Pilates bench 14 having upper surface 16 where user 100 lays in a supine position. If the legs 102 of the user are to be aligned for the exercise, without the reflective surface or mirror 20, the user cannot readily see its (his or her) legs. The mirror 20 is employed at a level so that the user can see its legs during exercise and alignment.

In addition to a Pilates apparatus, the mirror assembly 10 can be used in hospitals, dressing rooms and elsewhere a person can best see the portion of the body to be viewed. For example, a person in a store dressing room can maneuver the movable mirror apparatus or assembly to better so the back of the person or to better see how shoes fit.

By watching the portion of the body to be exercised from the mirror, in particular, but not limiting, the legs, the user can see how the user's legs are positioned for an exercise, for example, a Pilates exercise.

Figure 2:
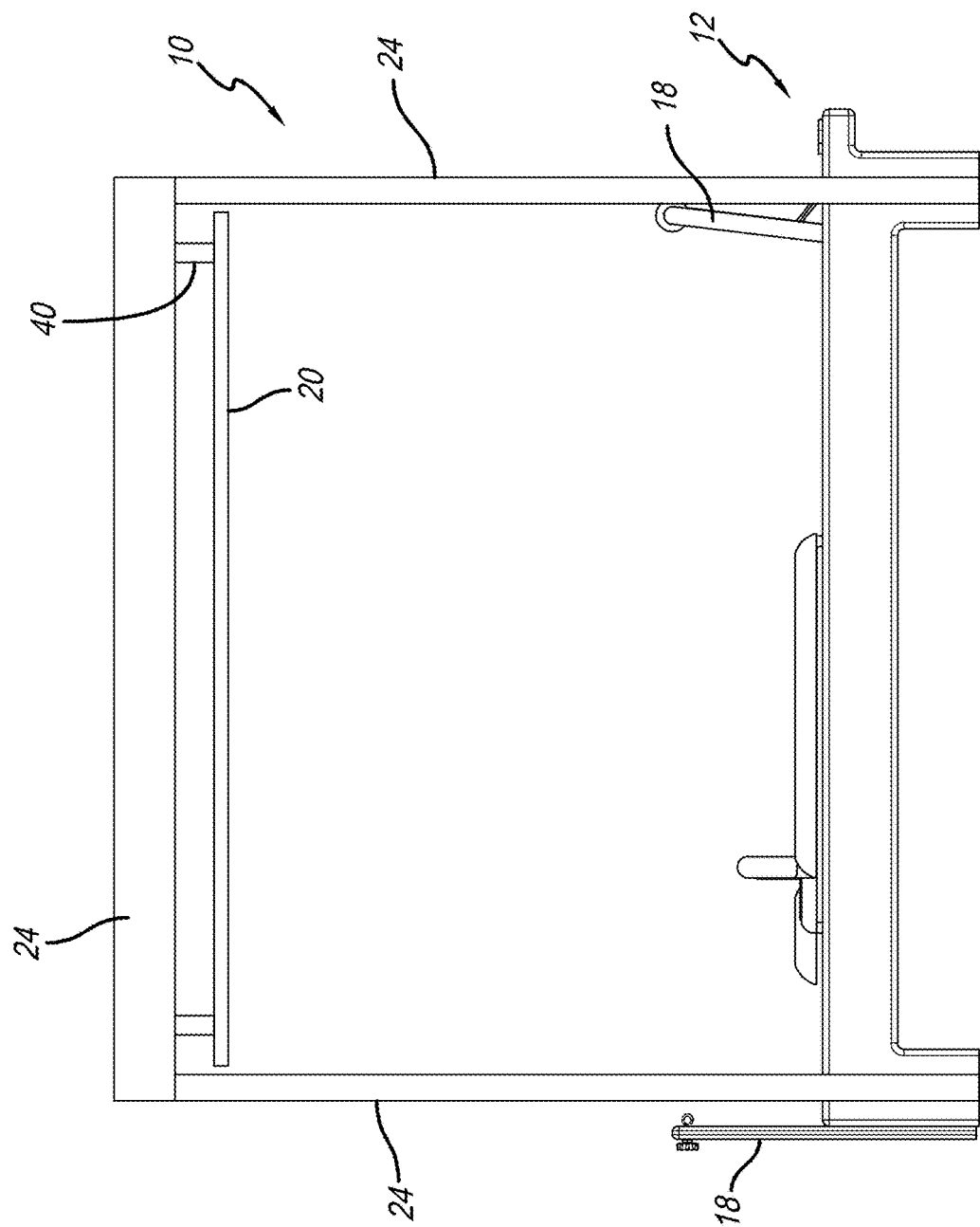
FIG. 2 shows an exercise apparatus of the present invention wherein the movable mirror assembly is positioned on vertical bars.

In several embodiments of the invention, the reflective surface or mirror 20 can extend from the ceiling using telescoping legs 22 which can be moved to be as close to the user as appropriate for viewing the body, legs or other extremities. See the arrow A1 in FIG. 1 indicating movement. The mirror 20 or mirror assembly 10 can be connected to the reformer or exercise apparatus 12 itself or any component thereof. For example, the mirror assembly 10 can be part of or extend from any of the components (generally labeled 18 in the drawings) of the Pilates reformer. The mirror of the mirror assembly may be extendable and/or retractable (e.g., between a stowed position and a deployed position), similar to the embodiment discussed below. Any of the components in the embodiment shown in FIGS. 3-6 can be included in the embodiment(s) shown in FIGS. 1-2. The mirror assembly 10 may also be hung from the ceiling (FIG. 1) or placed on the apparatuses upper vertical or horizontal bars 24 (FIG. 2) or hung via connections such as Velcro straps, wires, or electronic movable devices that allow the mirrored surface to move from and to the exercise apparatus 12, from the upper horizontal bars, or the ceiling above a traditional Reformer, Cadillac or Tower Pilates apparatus.

In a preferred embodiment, the reflective surface portion of the mirror assembly is sized so that the person exercising can see the body area to be properly aligned, whereby when an instructor or other form of instructions, instructs the person, particularly about alignment, the person can see from its the reflection the alignment issues and learn better from the Pilates instruction to better align. The surface or screen can also display an image of the body part to be seen properly aligned so the users can see the proper alignment. See, e.g., FIG. 6, described more below.

The reflective surface (e.g., a mirror) can include tints to enhance the reflection of the surface. It can include lights which can be adjusted to enhance the body image. The reflective surface can be a screen too, which can be associated with an image projection system whereby the proper alignment can be displayed on the screen or other images projected on the screen or reflective surface, e.g., mood images like the seas or clouds. The mirror can be a "Smart Glass" mirror and include a repetition counter, clock, and/or timer built or included therein so that a user can see these items while exercising or using the device, mirror assembly and/or exercise apparatus. 12. The reflective surface may be any size. For example, it may be 4 feet wide by 8 feet long but could vary from about 2 feet to 20 feet or more depending upon the exercise apparatus and exercise studio configuration.

Figure 3:
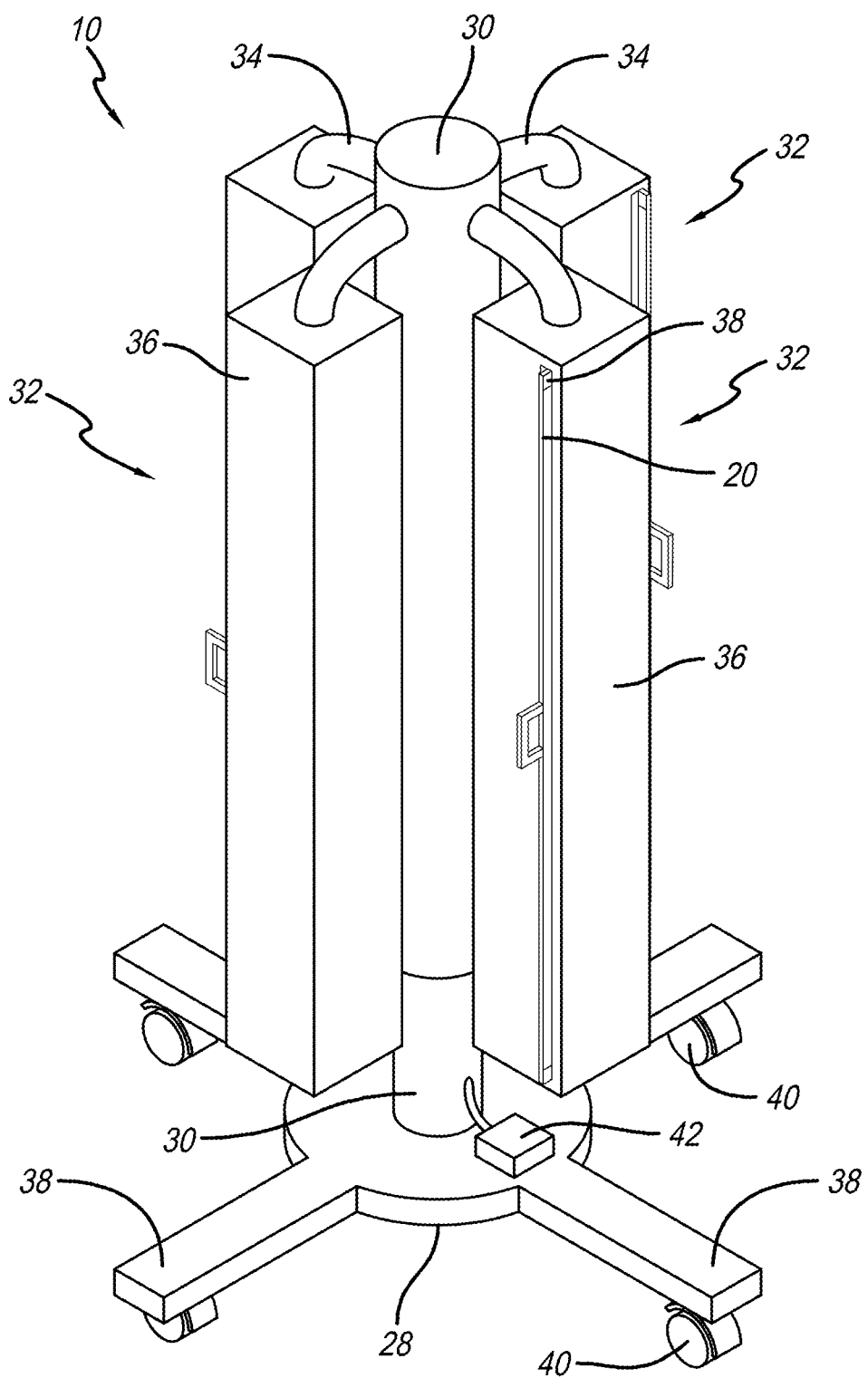
FIG. 3 shows an embodiment of a portable multi mirror assembly of the present invention.
Figure 4:
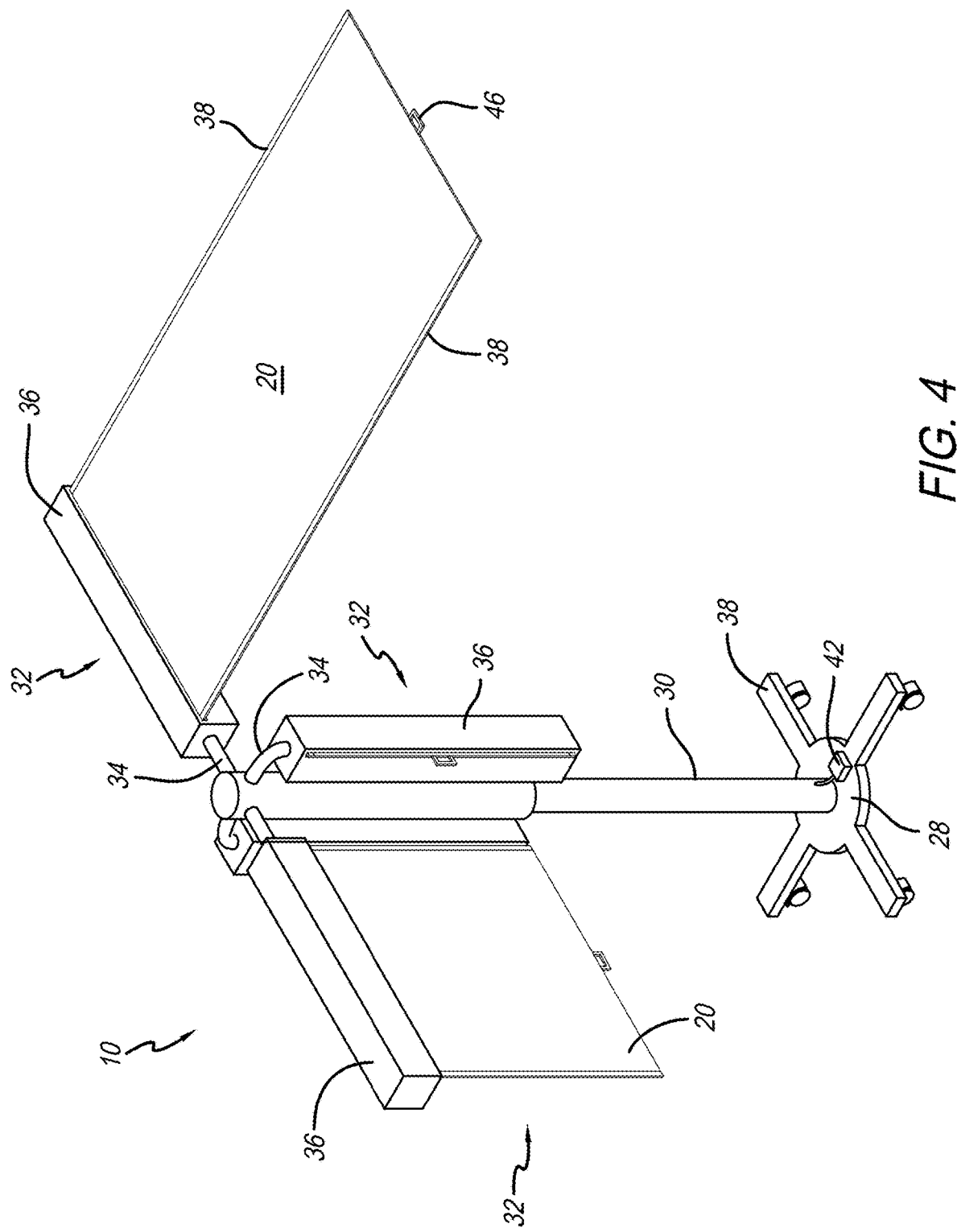
FIG. 4 shows the multi mirror stand of the present invention with two mirrors deployed.
Figure 5:
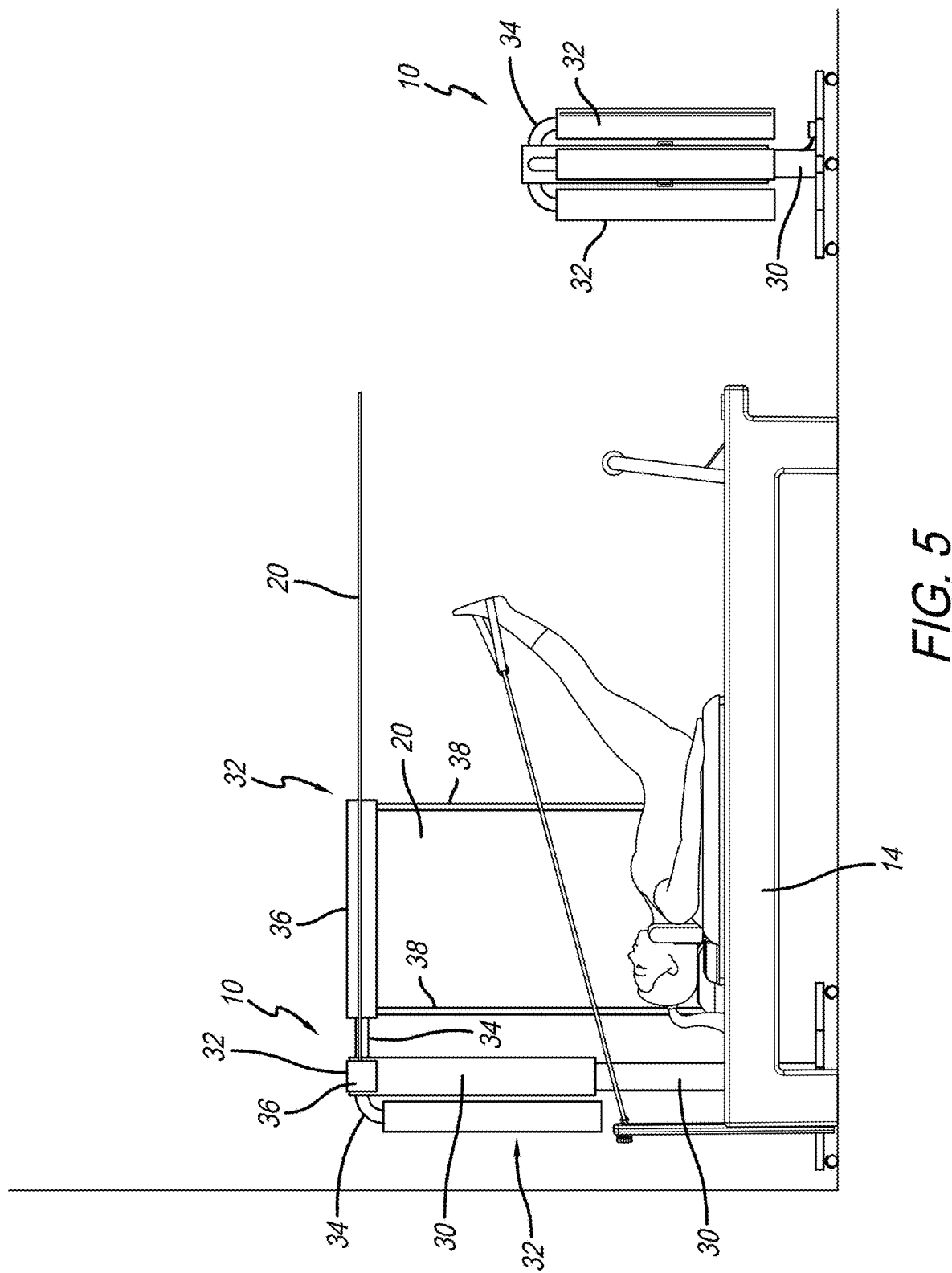
FIG. 5 shows the multi mirror stand of the present invention with two mirrors deployed above and adjacent the supine Pilates' users.

As shown in FIGS. 3-6, the mirror assembly 10 may include rollers 26 and instead of hanging from the ceiling, it can be placed on or may include a movable cart or base 28 to position the one or more mirror arm assemblies 32 adjacent the selected body part to be viewed. FIG. 3 shows a portable mirror assembly 10 that includes a base 28 with wheels or rollers 26, center post 30, mirror arm assemblies 32 and connection assemblies 34 that connect the mirror arm assemblies 32 to the center post 30. The connection assemblies 34 allow the mirror arm assemblies 32 to move, pivot, rotate or otherwise be positioned between a stowed position (as shown in FIG. 3) and any number of use positions (as shown in FIGS. 4 and 5) where the reflective surface or mirror 20 can be extended or deployed so a user can see themselves. The mirror 20 may be rolled up in the stowed position and stored in a container member 36 that can be any shape. The container members 36 are rectangular in the figures but may be cylindrical. The mirrors 20 may be similar to shades that are can be pulled out and then restowed. The center post 30 may be adjustable or telescopic so that the mirror arm assemblies 32 can be raised or lowered or positioned vertically. For example, see FIG. 5, which includes the center post 30 telescoped upwardly.

In a preferred embodiment, the mirrors 20 include rigid extension members 38 that maintain the mirror 20 in a deployed or flat position when in use. The rigid extension members 38 can also roll up with the mirror for when stowed. FIG. 4 shows two of the mirror arm assemblies 32 in a use position with the mirror 20 associated therewith deployed, one in a vertical deployed positions and the other in a horizontal deployed position. It will be appreciated that the connection members 34 and the attached arm assemblies 32 may be able to extend past horizontal (FIG. 4 shows the two deployed arms in horizontal positions). Any position is within the scope of the present invention. The connection assemblies can be configured to hold the mirror 20 in angled or inclined positions or any position desirable when a user is viewing themselves. The connection members may include pivoting or rotatable action along the length thereof or there may be separate pivots, joints, rotation mechanisms, sockets, universal joints, electronic connections, etc. between the center post and the connection member and/or between the connection member and the mirror arm assembly or container member.

FIG. 5 shows two mirror assemblies 10, one in use on the opposite side of the Pilates reformer and a second with the mirror arm assemblies 32 in the stowed position, stored at the end of the Pilates reformer. For example, the mirror assembly 10 can be rolled to the side of the bench 14 so that if the user is on its side or if the instructor wants the user to turn its head to see the reflection. The deployed mirror assembly 10 includes a first mirror arm assemblies 32 with the mirror 20 deployed horizontally above the user and a second mirror arm assembly 32 deployed vertically to the left of the user so they can turn their head to see the reflection.

The mirror assembly 10 can readily be rollable or fixed or a mirror can be spray painted on a surface to be reflective. The reflective surface and instruction can also be a component for smart glasses and goggles. For example, one-way acrylic mirror film rolls are commercially available.

The reflective surface 20 alone or in a frame holding the mirror can include magnifying areas or a magnification system that includes a mechanism to move the surface up or down or adjust the magnification to allow the user to better see the user for instruction purposes. The reflecting surface can be adapted to connect to the apparatus above the person or to side or another portion of the user. The connection assemblies 24 can comprise a snap, screw, or other such connection that will allow the assembly to be easily connected and disconnected.

The mirror assembly of FIG. 3 includes four mirror arm assemblies each including a deployable rolled mirror 20. Although four arms are shown in the drawings, the invention may include more or less. For example, the invention includes preferably at least two, and optimally three or four such mirror arm assemblies. They are firmly connected to the center post 30 by the connection assemblies 34. The connections allow the arms to be raised to a desired level as shown in FIG. 4. The connections allow smooth movement of the mirror arm assemblies and also allow for locking them in position for use.

The center post 30 can be connected to the movable base or stand 28 having arms 38 and associated rollers 40. As shown in FIG. 4, a select number of the mirrors 20 can be deployed while the others remain in their containers 36. The center post 30 can be made telescopic as shown in FIG. 4 to allow the mirrors 20 to be selectively positioned. The mirror assembly 10 can also include a controller 42 that can facilitate the positioning of the mirror arm assemblies 32, mirrors 20 or other components. In other words, any of the various components can be electronically controlled or positioned. The assembly may include a remote control or the like. Wiring and electronic communication between components can be included. The arm assemblies 32 can be replaceable. For example, the connection to the center post 30 may include interchangeable or quick-change connections.

With reference to FIG. 5, shown is a user on its back adjacent to one of the mirrors 20 allowing the users to turn its head to see its body. In another embodiment, the mirror container member 36 can slide or more axially or the mirror itself may deploy out of the container axially, for example, along a telescopic connection. Any configuration where the mirror deploys from a container member is within the scope of the present invention.

Figure 6:
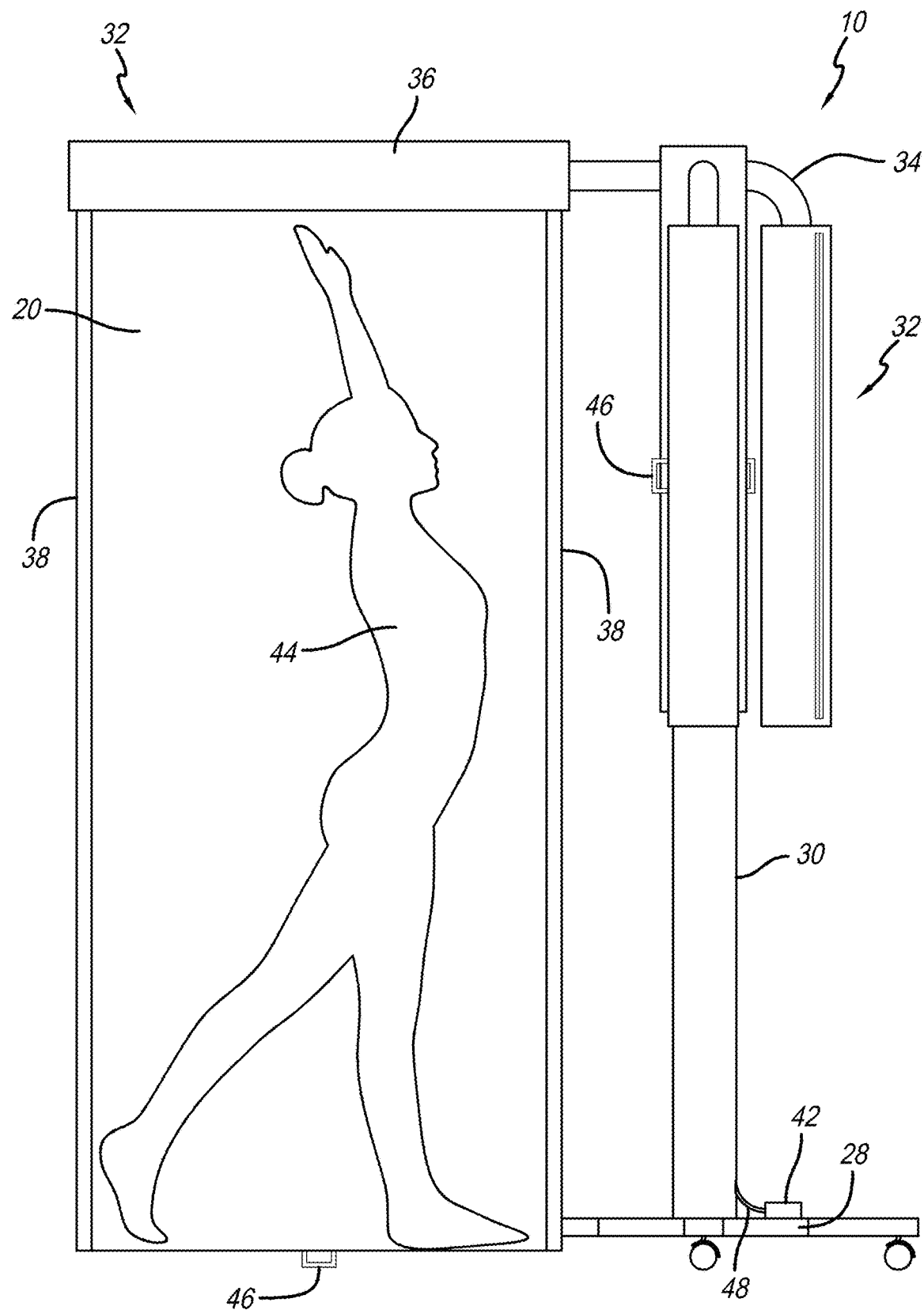
FIG. 6 shows use of a moveable mirror with an image of a properly aligned body position on the screen.

FIG. 6 shows a mirror assembly 10 with a single arm assembly 32 deployed with the mirror or screen displaying an image 44 of proper body part alignment for the user while using the device. The mirrors 20 in the arm assemblies 32 are disposed in a container member 36 and may include a handle 46 to pull the mirror out and so the mirror can be positioned and locked into place for use and then rolled back for storage after use as shown in FIG. 3. The container members can be rectangular as shown in FIG. 3, but also can have a round or other shaped cross-section. The arm assemblies can be tightly positioned close to the center post to prove for ready storage for use in the studio, or the assembly can be moved to another location. The mirror 20 or screen can be made of a film or other thin material that allows the mirror or screen to roll up or retract. The extension member(s) are included to hold the mirror flat during use. The extension members can be included along the edges of the screen (as shown in the figures) or anywhere else on or along the screen or mirror that holds the mirror in place. In another embodiment, the extension members can be extendable, telescopic or otherwise movable independently of the mirror. The mirror can include a reflective surface on both sides.

As discussed above, the apparatus can include a controller, control device e.g., CPU and appropriate switches and controls to move the arms automatically via a program via wire(s) 48 or Bluetooth or other wireless connectivity, including in a separate controller. The control device can feed images to the reflective mirror surface to the screen.

In operation, the mirror apparatus is provided to the users or an instructor, and then positioned appropriately to allow the users to see its alignment. The controller can be used to deploy the mirror, retract it and provide audio and visual information to the user. Once the moveable multi-mirror apparatus is used, the mirrors can be retracted, and the arms positioned so the mirror containers are adjacent the center post for convenient storage. The assembly may be simplified to where the mirror 20 is part of a mirror arm assembly and is movable, but the mirror is always in a deployed or extended position. The arm itself may just be movable to different positions.

In a preferred embodiment, the connection assemblies 34 are equipped with a locking mechanism to allow the mirror arm assembly 32 to be locked in place. The connection assemblies may also include a coupling system that allows matching halves to be fixed together securely, e.g., bayonet locking, screw locking, snap-in locking, push-pull locking, latch locking and lever locking.

In an embodiment of the invention, the exercise or other use apparatus may be a table for laying down, a chair which reclines or a floor mat or carpet or the like.

Any number of methods of use of the present invention can be included. For example, use of the mirror assembly can include obtaining the mirror assembly, positioning adjacent to or on an exercise or other use apparatus, moving a mirror arm assembly from a stowed position to a use position and moving a mirror from a stowed or retracted position to a deployed position and viewing a reflection in the mirror during use. The use may be during exercise, while trying on clothes, while at a hospital or any other desired use. Generally, the use includes moving a mirror from a first, retracted or stowed position to a second or use position. It will be appreciated that retracted is not limited to rollable. The mirror could also be foldable or simply movable from a position where it cannot be seen to where it can be seen. Simply moving the mirror closer or to another position may also be considered moving the mirror from a retracted position to a deployed position. For example, moving the mirror shown in FIG. 1 from a first position to a second position (e.g., closer to the user) is considered moving the mirror from a retracted position to a deployed position.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements, or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure considering the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A mirror assembly comprising:
a center post,
a mirror arm assembly connected to the center post, wherein the mirror arm assembly includes a first mirror that is movable between a retracted position and a deployed position, wherein the mirror arm assembly is movable between a stowed position and a use position; wherein the center post is mounted on a base, and wherein the base includes rollers on a bottom thereof, wherein the first mirror includes at least a first extension member that is configured to maintain the first mirror in the deployed position, wherein the mirror arm assembly includes a container member, wherein in the retracted position, the first mirror is positioned in the container member in a rolled format, and wherein in the deployed position, the first mirror is positioned outside of the container member in a planar format, wherein the mirror assembly includes a second mirror arm assembly connected to the center post, wherein the second mirror arm assembly includes a second mirror that is movable between a retracted position and a deployed position, wherein the second mirror arm assembly is movable between a stowed position and a use position, wherein the second mirror arm assembly includes a second container member that houses the second mirror in a rolled format in the retracted position.

2. A method of using a reflective surface, the method comprising the steps of:
   (a) obtaining the mirror assembly of claim 1,
   (b) moving the first mirror from a retracted position to a deployed position, and
   (c) viewing a reflection in the first mirror.

3. The method of claim 2 further including the step of moving the first mirror arm assembly from a stowed position to a use position prior to step (b).

4. The method of claim 2 further including the steps of moving the second mirror from a retracted position to a deployed position, and orienting the first mirror at a different angle than the second mirror.

5. The method of claim 4 further including the step of moving the second mirror arm assembly from a stowed position to a use position prior to moving the second mirror from the retracted position to the deployed position.

6. The method of claim 2 further comprising the step of positioning the mirror assembly adjacent an exercise apparatus.

* * * * *